(12) United States Patent
Tyler et al.

(10) Patent No.: US 10,828,829 B2
(45) Date of Patent: Nov. 10, 2020

(54) ADDITIVE MANUFACTURING SYSTEM HAVING ADJUSTABLE NOZZLE CONFIGURATION

(71) Applicant: CC3D LLC, Coeur d'Alene, ID (US)

(72) Inventors: Kenneth L. Tyler, Coeur d'Alene, ID (US); Ryan C Stockett, Lebanon, NH (US)

(73) Assignee: Continuous Composites Inc., Coeur d'Alene, ID (US)

( * ) Notice: Subject to any disclaimer, the term of this patent is extended or adjusted under 35 U.S.C. 154(b) by 345 days.

(21) Appl. No.: 15/798,296

(22) Filed: Oct. 30, 2017

(65) Prior Publication Data

US 2018/0126642 A1    May 10, 2018

Related U.S. Application Data

(60) Provisional application No. 62/417,709, filed on Nov. 4, 2016.

(51) Int. Cl.
*B29C 64/20* (2017.01)
*B29C 64/209* (2017.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC . B29C 64/209; B29C 64/264; B29C 67/0055; B29C 35/04; B29C 44/1266; B29C 64/112; B29C 64/336; B33Y 30/00
See application file for complete search history.

(56) References Cited

U.S. PATENT DOCUMENTS

| 3,286,305 A | 11/1966 | Seckel |
| 3,809,514 A | 5/1974 | Nunez |

(Continued)

FOREIGN PATENT DOCUMENTS

| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Alison L Hindenlang
*Assistant Examiner* — Shibin Liang
(74) *Attorney, Agent, or Firm* — Ryan C. Stockett (57) ABSTRACT

A print head is disclosed for use with an additive manufacturing system. The print head may include a matrix reservoir, and a nozzle base connected to an end of the matrix reservoir. The nozzle base may have a plurality of attachment features formed within an exposed surface. The print head may further include a plurality of available dies separately connectable to the nozzle base via the plurality of attachment features. Attachment of the plurality of available dies to the nozzle base may establish fluid communication with the matrix reservoir.

20 Claims, 3 Drawing Sheets

(51) Int. Cl.
*B33Y 30/00* (2015.01)
*B33Y 50/02* (2015.01)
*B33Y 40/00* (2020.01)
*B29C 64/118* (2017.01)
*B29C 64/386* (2017.01)
*B29C 64/393* (2017.01)
*B29C 64/106* (2017.01)
*B29C 70/38* (2006.01)
*B29C 64/291* (2017.01)
*B29C 64/245* (2017.01)
*B29C 64/141* (2017.01)
*B29C 64/264* (2017.01)
*B29C 64/307* (2017.01)
*B29C 64/379* (2017.01)
*B29C 64/336* (2017.01)
*B29C 64/165* (2017.01)
*B29C 64/227* (2017.01)
*B29C 64/40* (2017.01)
*B33Y 10/00* (2015.01)
*B29C 35/08* (2006.01)
*B29C 35/02* (2006.01)
*B29K 105/08* (2006.01)
*B29B 15/12* (2006.01)
*B29C 70/52* (2006.01)
*B29C 31/04* (2006.01)
*B29C 64/259* (2017.01)
*B33Y 70/00* (2020.01)
*B29C 64/295* (2017.01)

(52) U.S. Cl.
CPC .......... *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08); *B29C 64/307* (2017.08); *B29C 64/336* (2017.08); *B29C 64/379* (2017.08); *B29C 64/386* (2017.08); *B29C 64/393* (2017.08); *B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); *B29C 31/042* (2013.01); *B29C 35/0261* (2013.01); *B29C 64/259* (2017.08); *B29C 64/295* (2017.08); *B29C 70/524* (2013.01); *B29C 2035/0827* (2013.01); *B29C 2035/0855* (2013.01); *B29K 2105/08* (2013.01); *B33Y 10/00* (2014.12); *B33Y 70/00* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,293,554 B2 * | 5/2019 | Hakkaku ............... B29C 64/40 |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0011106 A1 | 1/2003 | Osaki |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2010/0283809 A1 | 11/2010 | Bastani et al. |
| 2011/0032301 A1 | 2/2011 | Fienup et al. |
| 2011/0143108 A1 | 6/2011 | Fruth et al. |
| 2011/0298877 A1 | 12/2011 | Blessing |
| 2012/0060468 A1 | 3/2012 | Dushku et al. |
| 2012/0159785 A1 | 6/2012 | Pyles et al. |
| 2012/0212540 A1 | 8/2012 | Dietl |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0044822 A1 | 2/2014 | Mulliken |
| 2014/0061974 A1 | 3/2014 | Tyler |
| 2014/0159284 A1 | 6/2014 | Leavitt |
| 2014/0232035 A1 | 8/2014 | Bheda |
| 2014/0242208 A1 * | 8/2014 | Elsworthy ............ B29C 31/042 425/375 |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |

(56) References Cited

U.S. PATENT DOCUMENTS

| | | |
|---|---|---|
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waafti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2019/0084219 A1* | 3/2019 | Brusilovski ........... B29B 13/022 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2015163862 A1 | 10/2015 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

(56) References Cited

OTHER PUBLICATIONS

Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).
3D Chocolate Printer, by Kira, Sep. 19, 2015. Available at http://www.3ders.org/articles/20150919-childhood-fantasy-come-true-a-3d-chocolate-printer-made-from-lego.html, retrieved on Dec. 23, 2013.
International Search Report dated Jan. 22, 2018 for PCT/US17/59442 to CC3D LLC Filed Nov. 1, 2017.

* cited by examiner

ADDITIVE MANUFACTURING SYSTEM HAVING ADJUSTABLE NOZZLE CONFIGURATION

RELATED APPLICATIONS

This application is based on and claims the benefit of priority from U.S. Provisional Application No. 62/417,709 that was filed on Nov. 4, 2016, the contents of which are expressly incorporated herein by reference.

TECHNICAL FIELD

The present disclosure relates generally to a manufacturing system and, more particularly, to an additive manufacturing system having an adjustable nozzle configuration.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) and/or diversity required for some applications.

The disclosed system is directed at addressing one or more of the problems set forth above and/or other problems of the prior art.

SUMMARY

In one aspect, the present disclosure is directed to a die for a print head of an additive manufacturing system. The die may include a plurality of wall blocks pre-assembled to form an open-ended enclosure. The die may also include at least one orifice block located inside the open-ended enclosure.

In another aspect, the present disclosure is directed to a print head for an additive manufacturing system. The print head may include a matrix reservoir, and a nozzle base connected to an end of the matrix reservoir. The nozzle base may have a plurality of attachment features formed within an exposed surface. The print head may further include a plurality of available dies separately connectable to the nozzle base via the plurality of attachment features. Attachment of the plurality of available dies to the nozzle base may establish fluid communication with the matrix reservoir.

In yet another aspect, the present disclosure is directed to another print head for an additive manufacturing system. This print head may include a matrix reservoir, and a nozzle base connected to an end of the matrix reservoir. The nozzle base may have a plurality of attachment features formed within an exposed surface. The print head may also include a plurality of wall blocks separately connectable to the nozzle base via the plurality of attachment features to form an open-ended enclosure, and at least one orifice block connectable to the nozzle base via at least one of the plurality of attachment features at a location inside the open-ended enclosure. Attachment of the at least one orifice block to the nozzle base may establish fluid communication with the matrix reservoir.

DETAILED DESCRIPTION

Figure 1:
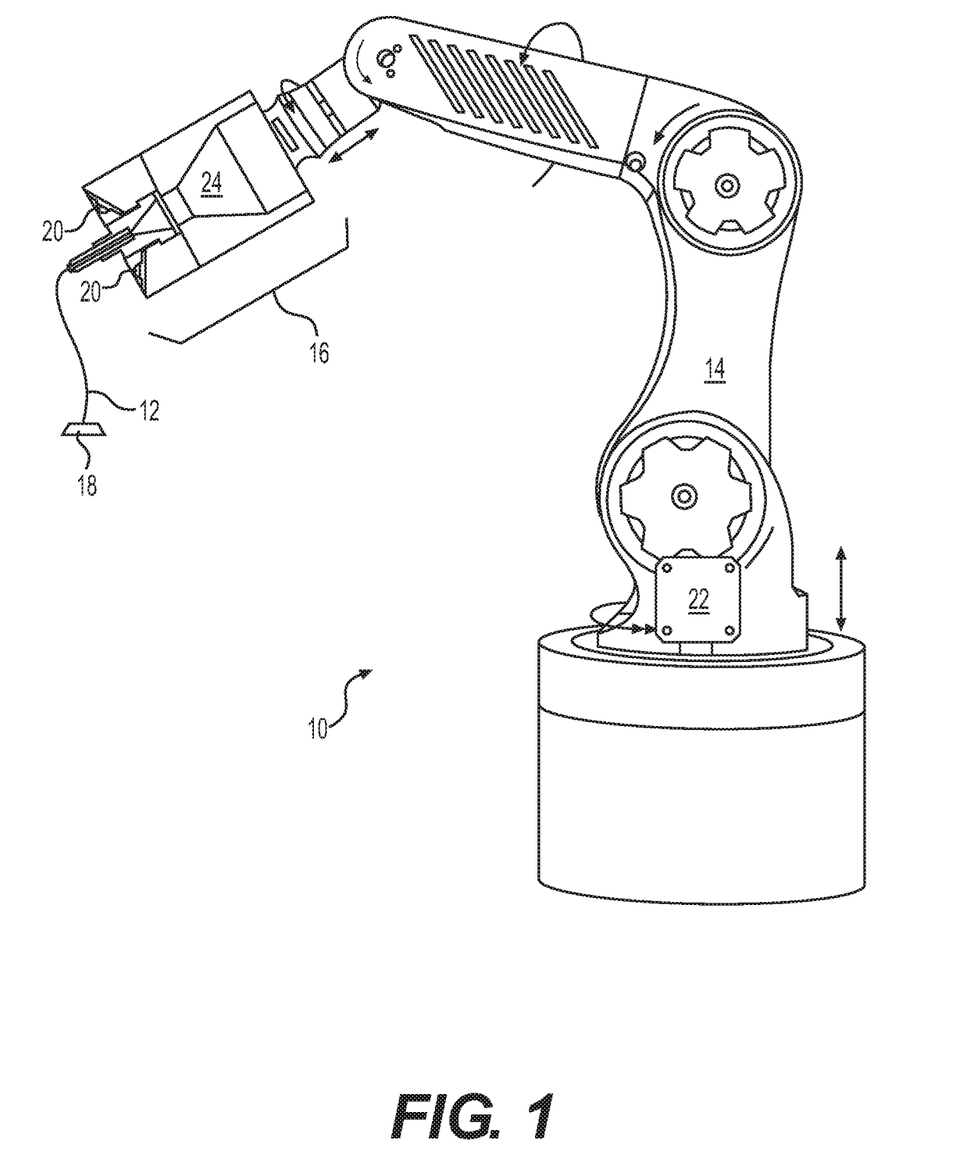
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16 (e.g., as a pre-preg material), and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix material as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired compacting and curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20 such that structure 12 is produced in a desired manner.

Figure 2:
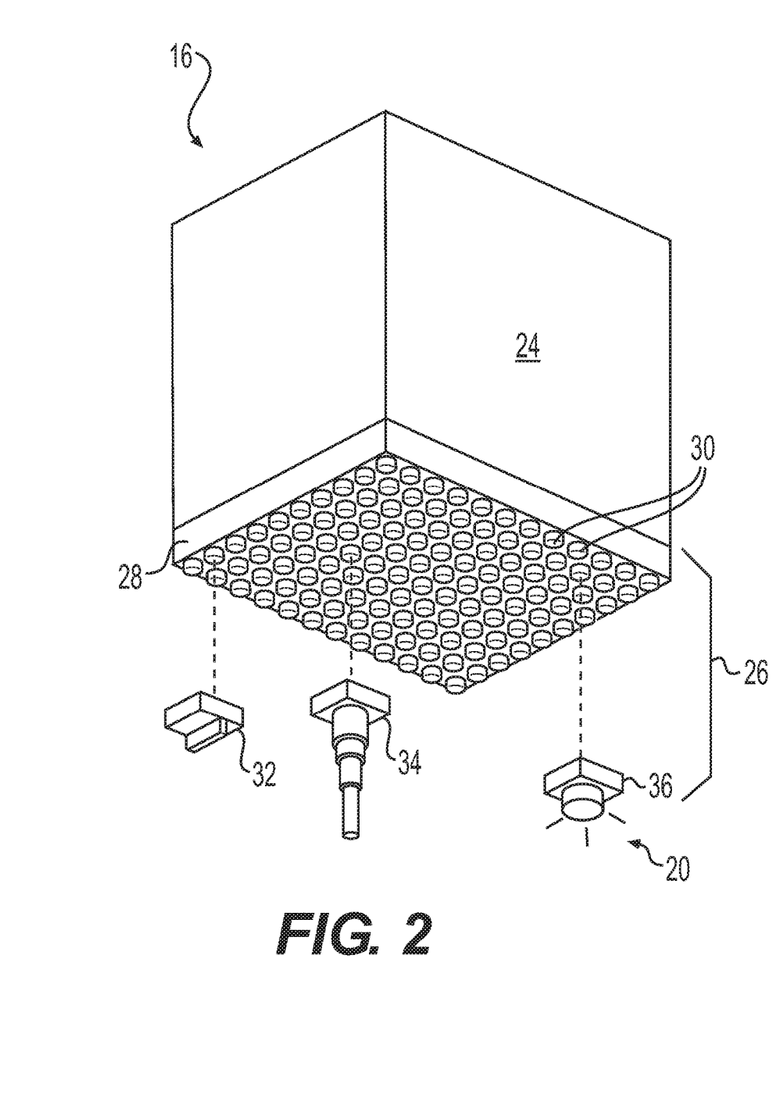
FIGS. 2 and 3 are diagrammatic illustrations of an exemplary disclosed head that may be utilized with the manufacturing system of FIG. 1.
Figure 3:
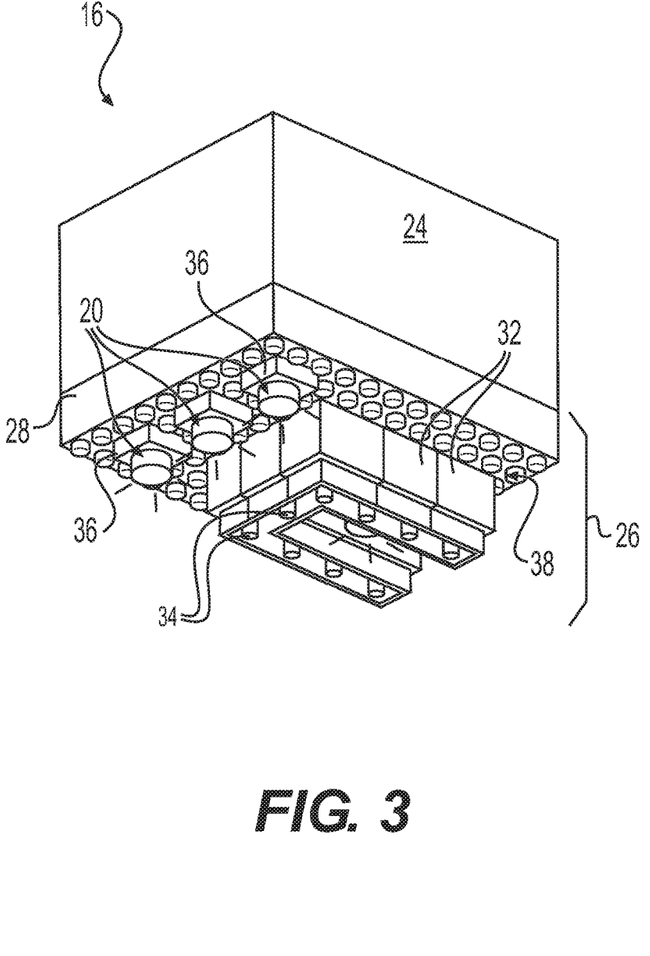

An exemplary head 16 is disclosed in detail in FIGS. 2 and 3. As can be seen in these figures, head 16 may be modular and configured to change configuration in a plug-and-play manner (e.g., like interlocking building blocks), such that structures 12 of varying cross-sectional shapes and sizes may be produced. Head 16 may include, among other things, a matrix reservoir 24 that is connectable to a distal end of support 14, and a configurable nozzle 26 that is operatively and fluidly connected to receive matrix only and/or matrix-coated reinforcements from an end of matrix reservoir 24 opposite support 14.

Nozzle 26 may have a base 28 that includes any number of attachment features (e.g., posts and holes, latches and catches, etc.) 30 distributed across an exposed end face. One or more functional blocks may be removably attachable to base 28 via features 30. These functional blocks may include, among others, wall blocks 32, orifice blocks 34, and cure blocks 36. Wall blocks 32 may have one or more walls (e.g., straight-line walls, angled walls, segmented walls, L-shaped walls, tilted walls, curved walls, etc.) that can be oriented to direct flows of matrix only and/or matrix-coated reinforcements during extrusion from nozzle 26. Multiple wall blocks 32 may be arranged to form an open-ended enclosure, which can be used to channel and/or shape the flows in a particular manner. One or more orifice blocks 34 may be connected to base 28 at a location inside of the enclosure formed by wall blocks 32, and used as gates or valves that allow the flows of matrix or matrix-coated fibers to pass from matrix reservoir 24 into or through the enclosure. Cure blocks 36 may host one or more cure enhancers 20, and are typically connected to base 28 at an outer periphery of the enclosure formed by wall blocks 32. It is contemplated, however, that cure blocks 36 could additionally or alternatively be located inside of the enclosure, if desired.

It is contemplated attachment features 30 may all be the same and used with all of the functional blocks, or different and dedicated to the use of only particular functional blocks. For example, each attachment feature 30 may include a centralized one-way port (e.g., a reed valve) that is selectively opened (e.g., pushed inward, pulled outward, twisted open, etc.) when a corresponding orifice block 34 is coupled therewith, as well as electrical leads (e.g., a negative lead at a lower surface of base 28, and a positive lead that protrudes away and is insulated from the lower surface) that provide power to cure blocks 36 upon establishment of the appropriate connection. Alternatively, some features 30 may include only the one-way port, while other features may include only the electrical leads. Wall blocks 32 may be connected to any available feature 30.

Wall blocks 32, orifice blocks 34, and/or cure blocks 36, when arranged in a particular manner, may constitute a die 38 (see FIG. 3) that produces a particular cross-sectional shape and/or size within structure 12. It is contemplated that these functional blocks could be pre-assembled into unique dies 38, if desired, and thereafter connected as an integral unit to base 28. In this manner, a first die 38 may be pulled away from base 28 and easily replaced with an alternative die 38 via a simplified process, if desired. Likewise, multiple relatively simple dies 38 could be connected to base 28 at the same time (see FIG. 4) and cooperate to produce a more complex die assembly of connected channels. This may allow for a large number of differently shaped structures 12 to be manufactured with the same head 16, without requiring an extensive collection of nozzles 26.

Figure 4:
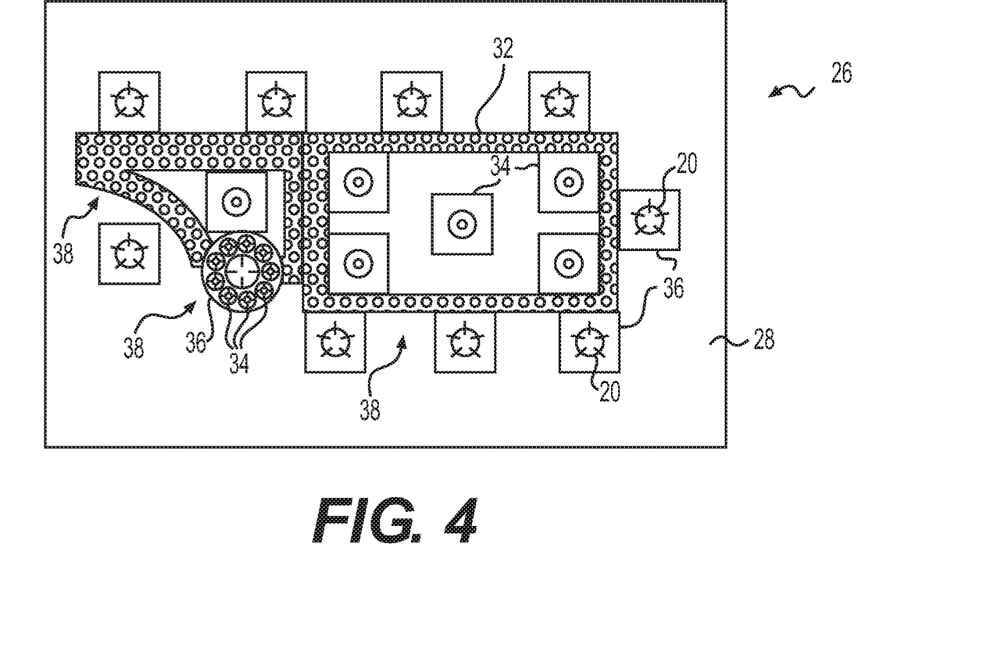
FIGS. 4 and 5 are diagrammatic illustrations of exemplary nozzle configurations that may be used in conjunction with the head of FIGS. 2 and 3.
Figure 5:
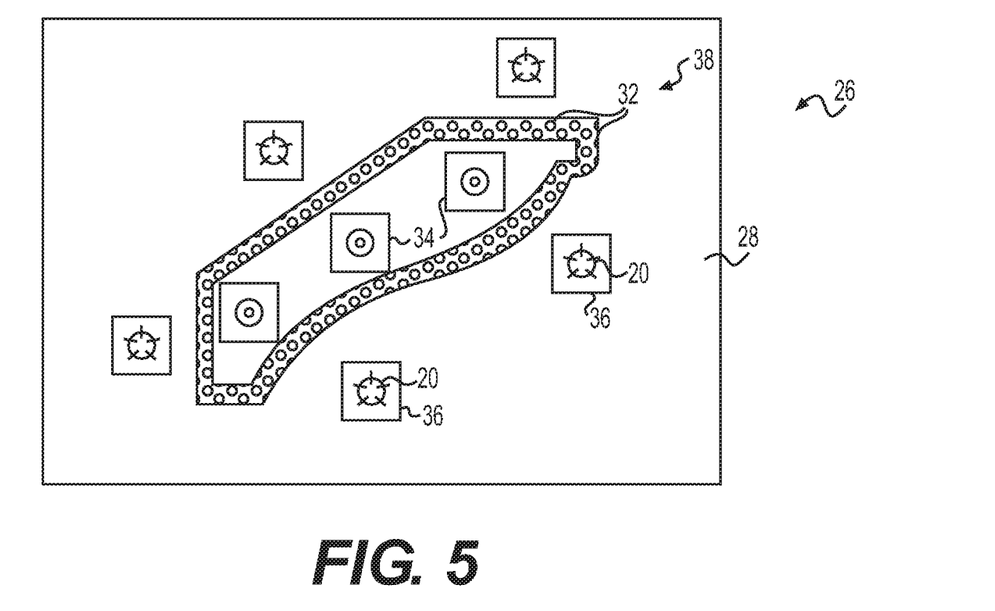

FIGS. 4 and 5 illustrate different examples of how functional blocks 32-36 and/or dies 38 can be arranged to produce different structures 12 having complex cross-sectional shapes and sizes. It should be noted that features 30 are not shown in FIGS. 4 and 5, for purposes of clarity. FIG. 4 illustrates a complex shape consisting of three separate dies 38 forming three separate enclosures. The enclosure of each die 38 is made from multiple separate wall blocks 32, some of which are straight and others of which are curved.

It should be noted that functional blocks of different sizes may be intermingled, if desired. One or more orifice blocks 34 are located inside of each of the enclosures, and multiple cure blocks 36 are positioned around the perimeter of each enclosure. FIG. 5 illustrates a complex shape consisting of wall blocks 32 forming a generally four-sided enclosure that can be used to fabricate a molding (e.g., crown molding). Three orifice blocks 34 are located inside of the enclosure, and five cure blocks 36 are positioned around the enclosure. Any number and shape of cooperating functional blocks 32-36 and/or dies 38 may be used to fabricate a single structure 12.

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix material. In addition, the disclosed heads may allow cooperative fabrication of complex structures via a variety of configurable nozzles. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, density stipulations, etc. It should be noted that this information may alternatively or additionally be loaded into system 10 at different times and/or continuously during the manufacturing event, if desired. Based on the component information, one or more functional blocks 32-36 or pre-assembled dies 38 may then be connected base 28 of nozzle 26. It is contemplated that this assembly may be completed manually, or automatically (e.g., by controller 22 causing support 14 to move head 16 to a configuration area having the functional blocks 32-36 and/or dies 38 set out and prepared in a manner that would allow hands free connection), as desired.

Different reinforcements and/or matrix materials may be selectively installed and/or continuously supplied into system 10. Installation of the reinforcements may be performed by passing the reinforcements down through matrix reservoir 24, and then threading the reinforcements through orifice block(s) 34 of nozzle 26. Installation of the matrix material may include filling matrix reservoir 24 and/or coupling of an extruder (not shown) to matrix reservoir 24.

Head 16 may then be moved by support 14 under the regulation of controller 22 to cause matrix-coated reinforcements to be placed against or on a corresponding anchor point 18. Cure enhancers 20 located within cure blocks 36 may then be selectively activated to cause hardening of the matrix material surrounding the reinforcements, thereby bonding the reinforcements to anchor point 18.

The component information may then be used to control operation of systems 10 and 12. For example, the reinforcements may be pulled and/or pushed from head 16 (along with the matrix material), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass through orifice block(s) 34 and into any associated enclosure formed by wall block(s) 32. The composite material may then take the shape of the enclosure, and be discharged as the cross-section of structure 12. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A die for a print head of an additive manufacturing system, the die comprising:
   a nozzle base;
   a plurality of wall blocks separately connectable to the nozzle base in a plurality of available configurations to form an open-ended enclosure configured to shape material discharging from the print head; and
   at least one orifice block connectable to the base at a location inside the open-ended enclosure and configured to discharge the material into the open-ended enclosure.

2. The die of claim 1, further including at least one cure block located at a periphery of the open-ended enclosure and configured to expose the material after discharge to energy that causes the material to cure.

3. The die of claim 2, wherein at least one of a location and a number of the at least one cure block is adjustable.

4. The die of claim 2, wherein the at least one cure block hosts at least one cure enhancer configured to enhance curing of a matrix discharging from the print head.

5. The die of claim 4, wherein the at least one cure enhancer is a UV light.

6. The die of claim 1, wherein the one of the plurality of available configurations of the open-ended enclosure is adjustable via movement of the plurality of separate wall blocks relative to the base.

7. The die of claim 1, wherein at least one of a location and a number of the at least one orifice block is adjustable.

8. The die of claim 1, wherein the plurality of wall blocks and the at least one orifice block each includes an attachment feature configured to removably engage a corresponding attachment feature of the base.

9. A print head of an additive manufacturing system, the print head comprising:
   a matrix reservoir;
   a nozzle base fluidly connected to an end of the matrix reservoir and having a plurality of attachment features formed within an exposed surface;
   a plurality of wall blocks separately connectable to the nozzle base via the plurality of attachment features in a plurality of different configurations, the plurality of wall blocks arranged to form an open-ended enclosure together that shapes material discharging from the print head.

10. The print head of claim 9,
    further including at least one orifice block located inside the open-ended enclosure and configured to discharge the material, wherein attachment of the at least one orifice block to the nozzle base establishes fluid communication with the matrix reservoir.

11. The print head of claim 10, further including at least one cure block mounted on the nozzle base in a plurality of adjustable configurations at a periphery of the open-ended enclosure and configured to expose the material after discharge to energy that causes the material to cure.

12. The print head of claim 11, wherein mechanical attachment of the at least one cure block to the nozzle base establishes at least one electrical connection.

13. The print head of claim 9, wherein the the open-ended enclosure is connectable to the nozzle base at different locations.

14. The print head of claim 9, wherein multiple open-ended enclosures may be connected to the nozzle base at the same time to form a multi-part die assembly.

15. A print head of an additive manufacturing system, the print head comprising:
    a matrix reservoir;
    a nozzle base connected to an end of the matrix reservoir and having a plurality of attachment features formed within an exposed surface; and
    a plurality of wall blocks separately connectable to the nozzle base in a plurality of different configurations via the plurality of attachment features to form an open-ended enclosure that shapes material as it discharges from the print head; and
    at least one orifice block connectable to the nozzle base via at least one of the plurality of attachment features at a location inside the open-ended enclosure, wherein attachment of the at least one orifice block to the nozzle base establishes fluid communication with the matrix reservoir.

16. The print head of claim 15, further including at least one cure block connectable to the nozzle base via at least one of the plurality of attachment features at a periphery of the open-ended enclosure.

17. The print head of claim 16, wherein attachment of the at least one cure block to the nozzle base establishes at least one electrical connection.

18. The print head of claim 16, wherein at least one of the following is adjustable:
    a location of the at least one cure block;
    a number of the at least one cure block;
    a configuration of the open-ended enclosure;
    a location of the at least one orifice block; and
    a number of the at least one orifice block.

19. The print head of claim 16, wherein the at least one cure block hosts at least one cure enhancer configured to expose the material after discharge to energy to enhance curing of a matrix discharging from the print head.

20. The print head of claim 19, wherein the at least one cure enhancer is a UV light.

* * * * *